INVENTORS
MATTHEW T. THORSSON
JOHN A. ROBERTS
BY
Paul L. Kroker
ATTY.

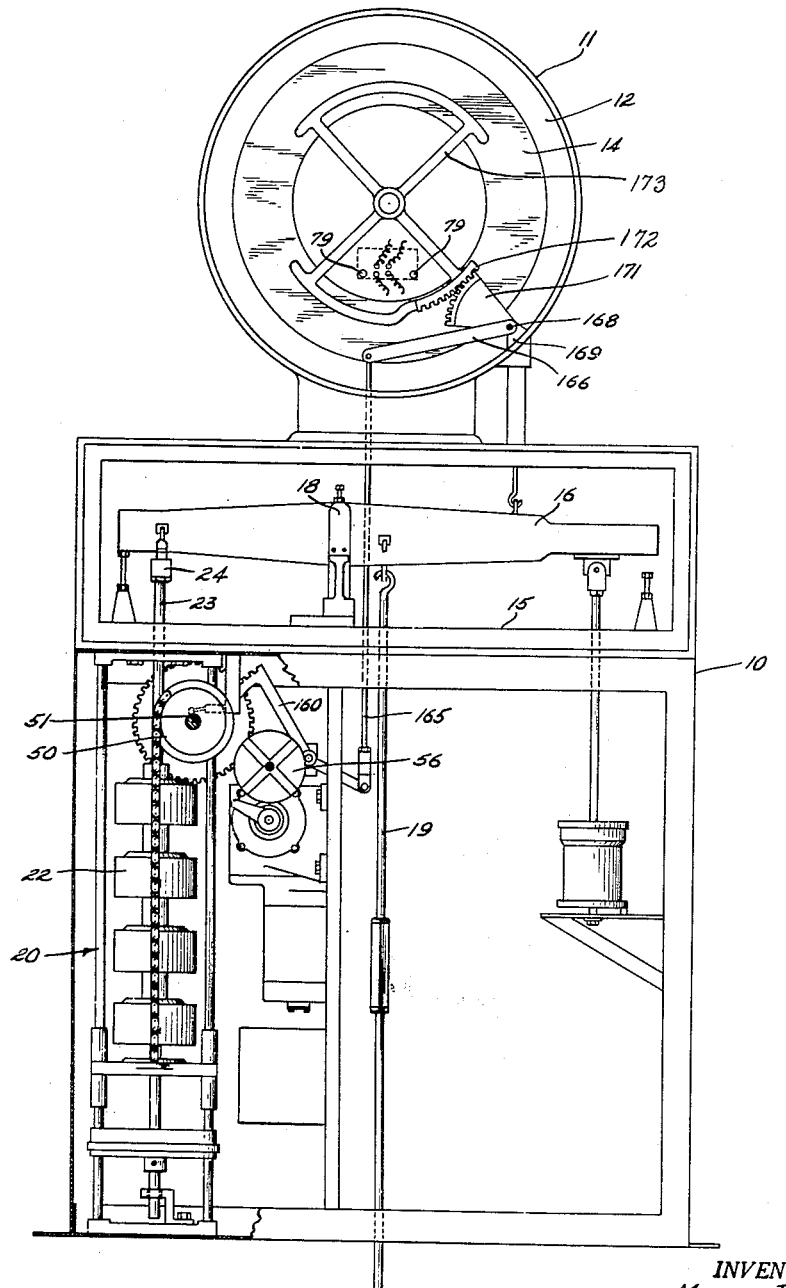

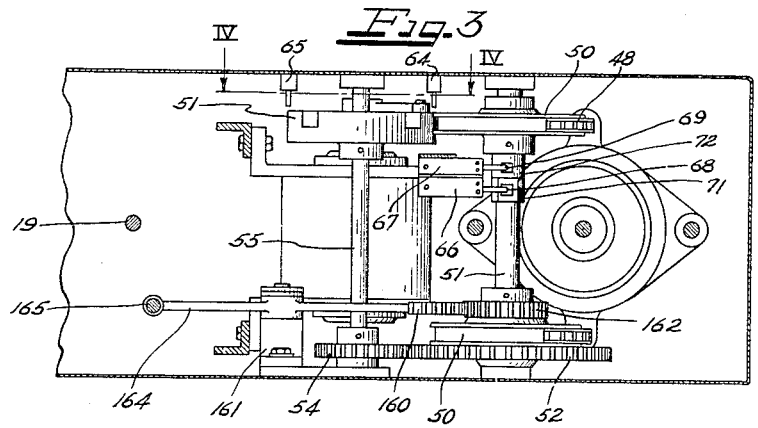

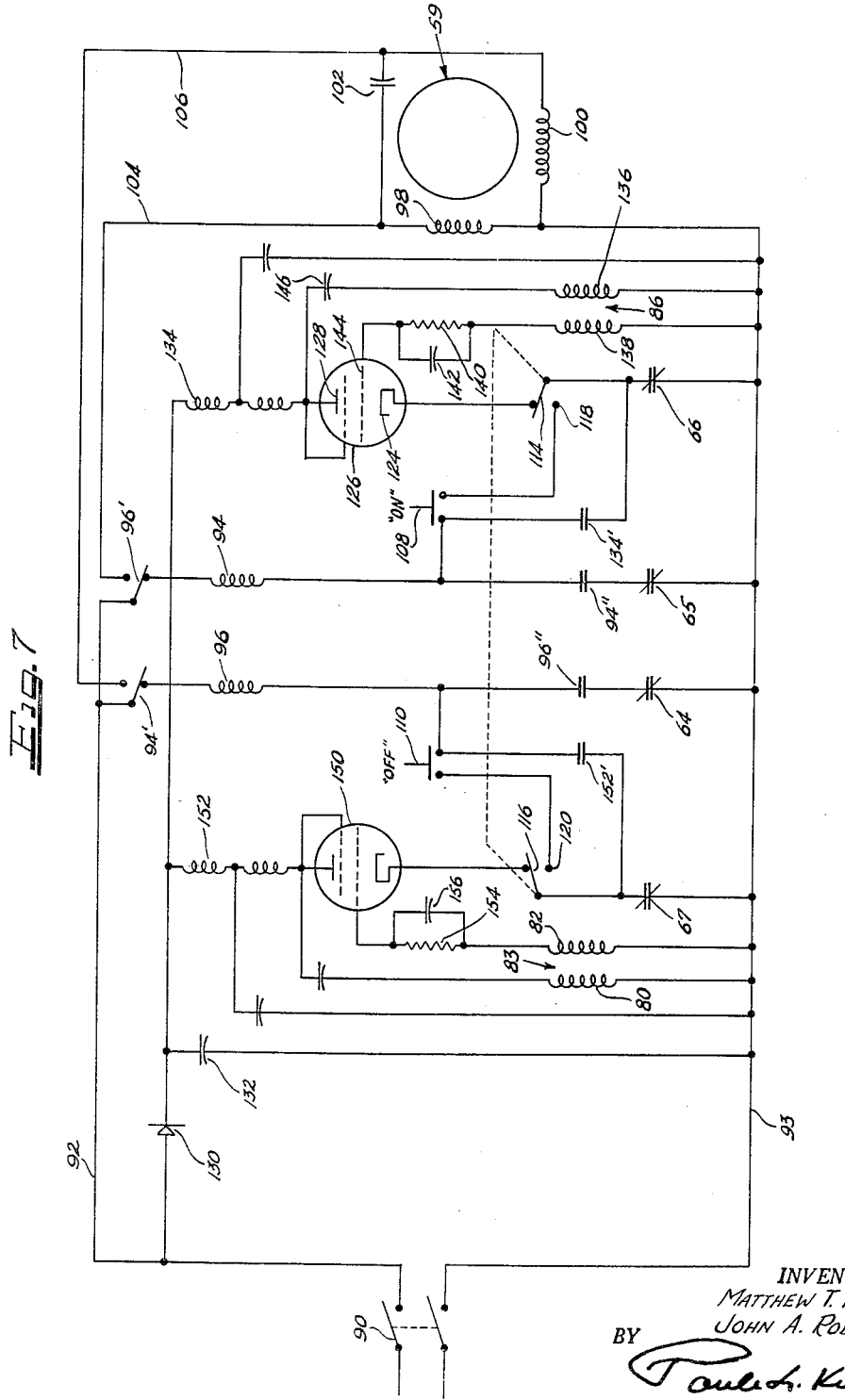

United States Patent Office 2,864,605
Patented Dec. 16, 1958

2,864,605

AUTOMATIC RANGE CHANGER WITH WEIGHT PICK-UP

Matthew T. Thorsson, Rock Island, Ill., and John A. Roberts, Davenport, Iowa, assignors to Fairbanks, Morse & Co., Chicago, Ill., a corporation of Illinois Application September 29, 1954, Serial No. 459,018

14 Claims. (Cl. 265—48)

This invention relates to weighing scales in which a series of unit or counterpoise weights are employed to increase the capacity of the scale above its normal capacity, and particularly to useful improvements wherein the increase in scale capacity is accomplished automatically.

Since the introduction of the practice of utilizing a series of counterpoise weights to increase scale capacity, it has been common procedure to add such weights to the scale weigh beam by manual means. Various mechanisms have been devised to replace the manual operation with semi-automatic or automatic means, the latter involving some device or system for causing operation of the particular mechanism whenever the scale load exceeds the scale capacity. The devices as heretofore used have not been completely successful, in that the use of power means to add or remove counterpoise weights is attended by the problem of partial operation of the weight adding mechanism, i. e., operation more or less than that required to add a weight, such that free movement of the scale weighing members is obstructed, resulting in an erroneous scale reading. In addition to this problem of partial operation of the weight adding mechanism, fully automatic mechanisms are subject to the problem of prematurely adding weights to increase the scale capacity. Such premature operation is due to the oscillation factor present in the conventional weighing scale, i. e. such an automatic mechanism having a device arranged to be actuated when scale capacity is reached, a shock load or initial movement of the members of the weighing system may actuate the device resulting in an increase in the scale capacity, although the load to be weighed may not, in fact, exceed the then scale capacity. Since the device for causing operation of the weight adding mechanism is actuated when scale capacity is reached, it is necessary that such actuation be prevented during that period when the scale weighing members oscillate to a balance position.

Accordingly, in meeting and overcoming the above mentioned problems, it is most desirable and advantageous to provide a weight adding mechanism suitable to increase the scale capacity when, but only when, the dead weight load on the scale exceeds the scale capacity, and to so construct the weight adding mechanism that when said weight adding mechanism is operated to increase the scale capacity, such operation will be controlled so as to add only the weights required by the load on the scale, no more and no less.

It is therefore, an important object of the present invention to provide efficient counterpoise means for adding successively, unit weights to the scale weigh beam to counter-balance any increased load whenever such increased load exceeds the then scale capacity.

Another important object of this invention is the provision of improved counterpoise means wherein such unit weights as are required to counter-balance the increased load, will be added without requirement of any manual control or operation.

Another important object is the provision of improved counterpoise means wherein the operation of said means to add or remove unit weights from the scale weigh beam will not occur until and unless the dead weight load on the scale exceeds the then scale capacity.

A further object of the present invention is the provision of improved counterpoise means whereby any operation of the counterpoise means will result in the addition or removal of the required unit weights to the exclusion of partial operation of said counterpoise means.

A still further object is the provision of improved counterpoise means wherein operation of the counterpoise means once set in motion will positively add or remove a unit weight, as required, to the exclusion of any change in the load on the scale.

According to the general features of the present invention and in one embodiment thereof, an actuator or interceptor secured to the scale indicator is arranged to interrupt an electrical coupling whenever the then scale capacity is reached. Interruption of this electrical coupling is sufficient, after a time delay and if interruption is continuous, to permit an electronic tube, to conduct thereby actuating relay coils to complete an electrical circuit. This circuit actuates a relay, establishing a holding circuit to operate a reversible motor, which through a Geneva mechanism operates to add one unit weight to the scale weigh beam. Should the addition of one unit weight be insufficient to counter-balance the increased scale load, the interceptor will continue interruption of the electrical coupling and consequently operation of the motor, thereby adding another unit weight to the weigh beam. If the aggregate unit weights are still insufficient to counter-balance the increased load, such operation as described will continue, and may do so until all available unit weights are added to the weigh beam, at which time a "bottom" limit switch would break the holding circuit and prevent further operation of the motor.

If, however, the aggregate unit weights at any time should be sufficient to counter-balance the increased scale load, the consequent movement of the indicator away from the now scale capacity will displace the interceptor from its position of interrupting the electrical coupling, thereby stopping operation of the motor. The driver of the Geneva mechanism, through which the motor operates to add weights, is arranged to open a switch momentarily after each unit weight is added. Said switch is designed to break the holding circuit, but where the electrical coupling remains interrupted the holding circuit is again established when said switch closes. Should the electrical coupling be not interrupted, the momentary opening of the switch by the Geneva driver is sufficient to break the holding circuit, thereby stopping operation of the motor and permitting the scale members to balance out at the now present scale capacity.

When the increased scale load is removed or reduced below the bottom limit of the now scale capacity, the indicator will return to a "zero" position, where a second electrical coupling is interrupted by the interceptor. Such interruption initiates a procedure similar to that above described which operates the motor in a reverse direction, and through the Geneva mechanism working in an opposite direction, removes the unit weights one at a time. Should there be no load on the scale the interceptor will remain in a position interrupting the electrical coupling, thereby maintaining a holding circuit until all unit weights are removed from the scale beam, at which time an "upper" limit switch will break the holding circuit and stop motor operation. Should the scale load be merely reduced below the lower limit of the present increased scale capacity, the indicator will move away from the "zero" position when that point is reached where the lower limit of the scale capacity is less than the scale load. This movement of the indicator displaces the interceptor from its position of interruption of the coupling, and the momentary opening of a second switch by the Geneva driver is sufficient to break the holding circuit, thereby stopping operation of the motor and permitting the scale members to balance out, within the now present scale capacity.

Further objects, features, and advantages of this invention will appear or be apparent to one skilled in the art from the following description, reference being made to the accompanying drawings, in which:

Fig. 2 is an elevational view of the back of the scale of Fig. 1, with parts of the housing removed or broken away.

Fig. 3 is an enlarged horizontal sectional view taken on lines 3—3 of Fig. 1, showing the relative disposition of the mechanical members of the counterpoise mechanism.

Fig. 4 is a sectional view taken on line 4—4 of Fig. 3, showing the Geneva device advanced to an operating position.

Fig. 5 is an enlarged elevational view, partly in section, showing the unit weights in an operative position.

Fig. 6 is an enlarged fragmentary sectional view taken substantially on line 6—6 of Fig. 1.

Fig. 7 is a diagrammatic view showing the electrical wiring employed with the counterpoise mechanism.

Figure 1:
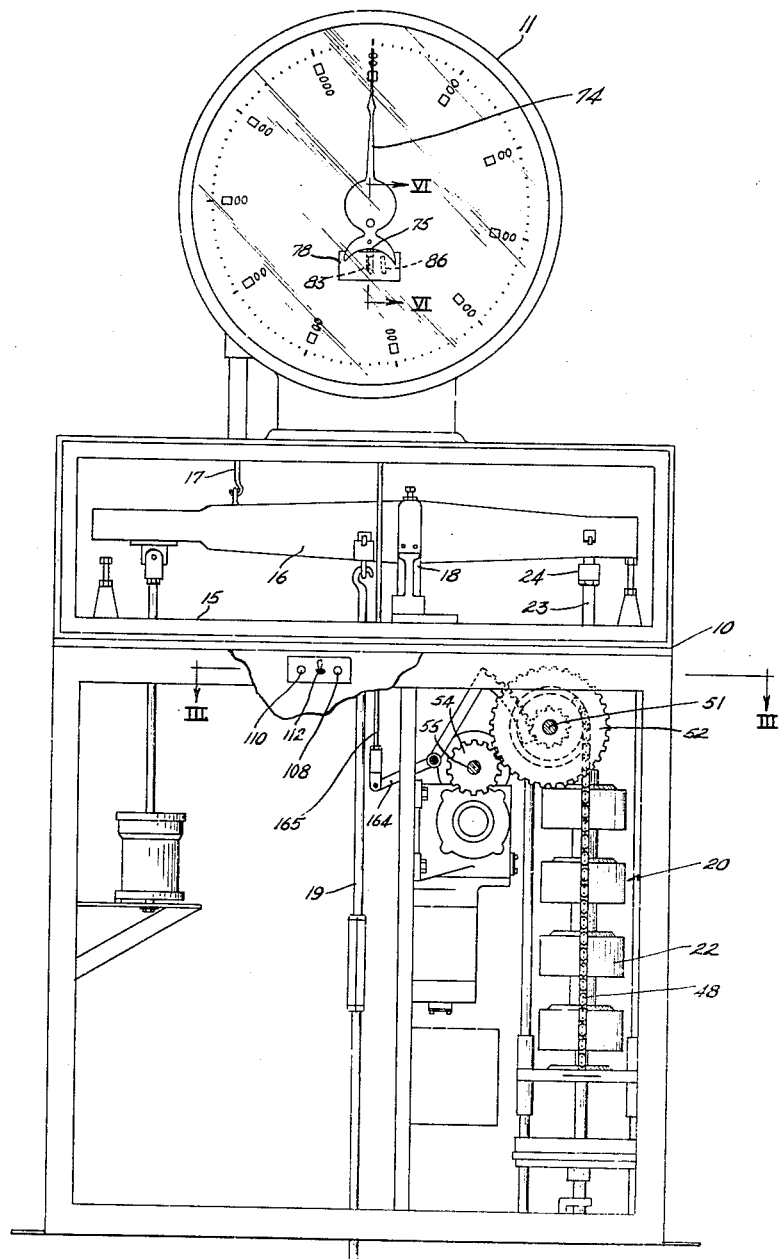
Fig. 1 is a front elevational view of a scale embodying the present invention, with parts of the housing broken away to show the scale mechanism and the unit weights in operative position.

Referring now to the drawings, the reference numeral 10 designates the scale frame with the cover plates removed, in which the weighing mechanism and unit weight mechanism are located. Surmounting the scale frame is a circular dial frame 11, within which are mounted the main or fixed dial 12 and annular auxiliary revolvable dial 14, coaxially mounted with the main dial, together with the usual automatic load counterbalancing mechanism, which is not shown. Mounted on a shelf 15 is the scale weigh beam 16, fulcrumed on the beam support 18 and connected by the pivotally mounted beam or load rod 19 to the usual lever system supporting a platform, not shown, as well as to the pointer of main dial 12 by the connecting rod 17, for weight indication in a well known manner. The lever system, main and auxiliary dials, and automatic load counterbalancing mechanism do not form a part of this invention, and only those parts are shown which are necessary to a proper understanding of the operation of the improved counterpoise mechanism.

The unit weight mechanism 20, for increasing the capacity of the scale, comprises essentially a series of dropweights or unit weights 22, as shown in Fig. 1, which are suspended from the butt end of the weigh beam 16 on a unit rod 23 pivotally mounted to said beam as at 24. The unit weights 22, which are preferably circular in form, are of equal size and weight varying in accordance with the total capacity of the scale and are adapted to telescopically interfit and cooperate with each other in adding increased weight capacities to the dial weight indication. Thus, each unit weight added to the weight suspended from the beam 16 is adapted to increase the capacity of the scale by an amount equivalent to the maximum capacity of the fixed dial, the total capacity of the scale being, therefore, in proportion to the number of unit weights used. For example, in the scale illustrated in the accompanying drawings, as shown in Fig. 1, the main dial 12 is arranged for a capacity of 1000 pounds and each unit weight 22 for an added capacity of 1000 pounds, providing thereby a total capacity of 5000 pounds. Various capacities may be arranged in like manner for the main dial 12 and unit weights 22 in hundreds or thousands of pounds, graduating the weight of the unit weights accordingly.

As best seen in Fig. 5, each unit weight 22 is provided with a circular interior chamber 26 having the upper portion thereof tapered inwardly to form a rim 27 and providing a top circular opening 28 leading therefrom to the top of the weight. The lower portion of said chamber 26 is provided with a circular recess 30 of greater diameter than the chamber 26 and having an outwardly tapering rim 31 terminating at the base of the unit weight to form an annular flat portion 32. In order to provide interconnecting means between the various unit weights 22, which means is adapted to hold the succeeding unit weights in suspension thereon, there is fixedly mounted in the base of each unit weight below the chamber 26 a depending unit weight connector 34 including a laterally extending annular flange 35 seated in a circular recess 30 and secured therein by screws 36. Extending downwardly from the flange 35 is a tubular portion 38 surrounding the rod 23 and spaced therefrom so as to permit free movement of the connector as it slides therealong. The tubular portion 38 of said connector extends through the top opening 28 of the succeeding unit weight and has a radial member 39 secured to the end thereof, said radial member having a tapered outer surface 40 adapted to engage and interfit with the tapered rim 27 of the unit weight. As shown, each unit weight, through its connector, supports the succeeding unit weight, and the entire series of unit weights is suspended from a supporting disc 41 suitably secured to the unit rod 23.

For the purpose of nesting the series of unit weights 22 in their inoperative position, the upper surface of each unit weight is provided with a beveled portion 42 adapted to engage and interfit with the tapered rim 31 of the adjacent unit weight.

The mechanism for supporting and moving the unit weights includes a carrier 43, which is annular in form and is provided with opposed vertically extending tubes 44 fixed thereto and slidably mounted on spaced guide rods 46, said guide rods being suitably secured to the scale frame. Formed on the top surface of the carrier 43 is a tapered portion 47 adapted to engage and interfit with tapered rim 31 of the bottom unit weight in lowering and raising one or more of the unit weights to their operative and inoperative positions respectively. Link chains 48 fixed to said carrier in opposing relation, extend upwardly to termination and securement to drums 50 mounted on shaft 51. Also mounted on shaft 51 is a gear 52 which meshes with a driver gear 54 carried by a shaft 55. As shown in Fig. 1, rotation of the driver gear 54 is transmitted at a decreased ratio to gear 52 for rotation of the latter, thereby causing through shaft 51 rotation of the drums 50. As will be explained later, the driver gear 54 can be caused to rotate either clockwise or counterclockwise, which movement will cause rotation of the drums 50 in a counterclockwise or clockwise direction, respectively, and such movement of the drums will act through link chains 48 to raise or lower carrier 43, as the case may be, thereby removing or adding unit weights 22 to the unit rod 23. For example, in Fig. 1 rotation of driver gear 54 in a clockwise direction will cause counterclockwise movement of gear 52 and of drums 50, thereby winding the link chains 48 onto their respective drums and raising carrier 43. As can be seen in Fig. 5, upward movement of said carrier will permit the tapered portion 47 of the carrier to engage with the tapered rim 31 of the bottom unit weight 22, and further upward movement will raise said unit weight away from the engagement of the connector tapered surface 40 with the tapered rim 27 of the unit weight, thereby removing said unit weight from suspension on the rod 23. If upward movement of the carrier 43 continues, then tapered portion 42 of the bottom unit weight 22 will engage tapered rim 31 of the next unit weight 22 causing its removal from suspension on the rod 23. In a like manner, all unit weights may be removed from suspension on the rod 23.

It is obvious that should the carrier be in a raised position initially, so that all unit weights are nested and removed from suspension on the unit rod, rotation of driver gear 54 in a counterclockwise direction will cause clockwise movement of the drums 50, permitting the carrier to descend and thus deposit the unit weights, one at a time on the unit rod.

As will be fully explained operation of driver gear 54 is controlled so that when all unit weights are removed or added, as the case may be, further rotation of the driver gear will be prevented. Furthermore, and as will be described, only such unit weights will be added or removed, as it is necessary to effect a scale capacity sufficient to weigh the then scale load.

Referring to Figs. 1, 2, 3 and 4, mounted on shaft 55 is a Geneva wheel 56 having four equi-spaced grooves or channels 58. Disposed directly below and adjacent said wheel is a reversible motor 59 suitably secured to the scale frame, and operable in a manner to be described. A Geneva driver 60 secured to motor shaft 62 has a roller 63 mounted on the outer end thereof, adapted to engage and move within the said wheel grooves. The wheel and driver are so arranged that one revolution of the driver is sufficient to rotate the wheel one-quarter of a revolution. One such movement will cause a one-quarter revolution of driver gear 54, and through gear 52 movement of the drums 50 sufficiently to move carrier 43 a distance to add or remove one unit weight, as the case may be.

Limit switches 64 and 65, mounted on the scale frame and positioned as shown in Fig. 4, will be actuated by the driver 60 once during each revolution of said driver. As will be explained, actuation of a limit switch upon the driver leaving engagement with the Geneva wheel, will prevent further operation of the motor and the driver, unless the relation of the scale load to the scale capacity is such that further addition or removal of unit weights is required.

It is apparent that in operating the unit weight mechanism through a Geneva device, overrun of the motor is not reflected in the disposition of the unit weights, i. e. any overrun of the motor will not cause additional movement of the carrier 43 since such overrun will occur when the Geneva driver is not engaging the Geneva wheel. Consequently, each one-quarter revolution of the Geneva wheel will be transmitted through the decreased ratio of driver gear 54 to gear 52, and result in movement of the carrier exactly that amount to add or remove one unit weight, and dispose it in a position where it will not interfere with or obstruct subsequent movement of the unit rod, and any weights thereon, in balancing out the scale load.

In addition, should the relation of the scale load to the scale capacity be such that actuation of the limit switches 64 or 65 does not stop motor operation, then another cycle of the Geneva device will occur with the consequent adding or removing of a unit weight as the case may be. Should the relation of the scale load to the scale capacity prevent said limit switches from stopping motor operation, the cycle will again repeat, and so on, until all unit weights have been added or removed, as the case may be, at which time a lower limit switch or upper limit switch, respectively, will cause operation of the motor to cease. As shown in Fig. 3, a lower limit switch 66 and an upper limit switch 67 are disposed adjacent shaft 51, and have followers 68 and 69, respectively, which extend to a position adjacent said shaft. Formed on the shaft 51, are cams 71 and 72 upon the surfaces of which, ride followers 68 and 69, respectively, each cam surface being formed to provide a flattened portion thereon. The followers of the switches ride on the outer cylindrical surface of their respective cams until rotation of shaft 51 is such as to cause one of the followers to drop, due to the flattened portion of its cam, thereby causing the switch of that particular follower to open, stopping motor operation.

Referring now to Figs. 1 and 6, the scale indicator 74 has an interceptor or actuator 75 secured to the tail end thereof by any suitable means, such as bolt 76. Mounted on dial 12 is a flat member or plate 78, secured by bolts 79 thereto and spaced apart from said dial to permit sweeping movement of the interceptor 75 therebetween. When indicator 74 is at the "zero" position (Fig. 1), interceptor 75 is disposed between coil 80, suitably mounted on dial 12 and coil 82, suitably mounted on plate 78. As will be explained, when current is flowing through coils 80 and 82 a magnetic field is set up between said coils, providing an electrical coupling 83, which magnetic field is broken or interrupted whenever interceptor 75 passes between the coils of said coupling. A similar coupling 86 is positioned to be interrupted by said interceptor whenever the indicator reaches the scale capacity.

Referring to Fig. 7, which is a schematic wiring diagram of the electrical control circuit of the present invention, it will be seen that a power switch 90 is adapted upon closure to supply alternating current voltage between leads 92 and 93. The A. C. voltage is supplied to electric motor 59, which is a reversible electric motor, through one or the other of a pair of relay contacts 94' and 96' of relay coils 94 and 96, respectively. Motor 59 is provided with two field coils 98 and 100 as well as a condenser 102 so that the motor will rotate in one direction or the other depending upon which of the two input wires 104 or 106 is connected to power supply lead 92. If wire 104 is connected by means of relay contacts 96' to power lead 92 motor 59 rotates in a direction to remove a unit weight from the unit rod 23 (Fig. 5). On the other hand when wire 106 is connected to power lead 92 through relay contacts 94', motor 59 operates in a direction to add a unit weight. Relay contacts 94' and 96' are respectively controlled by coils 94 and 96 in a manner now to be described.

With the weighing scale counterpoise system of this invention the unit weights may be completely automatically applied and removed, or semi-automatically applied and removed. "Semi-automatic" application and removal of unit weights is accomplished by means of operating a "weights on" push button 108 and a "weights off" push button 110, which are mounted on the front of the scale as shown in Fig. 1. To condition the scale for semi-automatic application and removal of unit weights a "manual-automatic" control switch 112 (Fig. 1) is provided. The control switch comprises a first switch leg 114 adapted to cooperate with a circuit including "on" button 108, and a second switch leg 116 associated with "off" button 110, the switch legs being ganged together as indicated in Fig. 7. When switch 112 is disposed in the semi-automatic position blade 114 engages contact 118 which is connected to one terminal of the "on" button 108, while blade 116 engages contact 120 which is connected to one terminal of "off" button 110. With the control switch 112 so disposed, "on" button 108 is connected in series with lower limit switch 66 and relay coil 94 across power supply lines 92 and 93. The lower limit switch 66 (Figs. 3 and 7) is normally closed, and is opened only when all of the unit weights are carried by the unit rod, i. e. when the carrier is in its lowermost position (Fig. 5). Upon rendering all of the unit weights effective shaft 51 is in such a position that the flat portion of cam 71 permits follower 68 to drop thereby opening the lower limit switch 66.

Since "on" button 108 is normally open, coil 94 will not be energized until the "on" button is pushed. In operation when it is desired to add a unit weight, the operator pushes "on" button 108 which energizes coil 94 from power lines 92 and 93 via normally closed lower limit switch 66, switch blade 114, "on" button 108 and relay contacts 96', which relay contacts are positioned to connect coil 94 to line 92 since coil 96 is not energized. Upon energization coil 94 causes relay contacts 94' to move to a position connecting wire 106 to power lead 92. Thus as previously described motor 59 operates in a direction to add a unit weight. As long as the "on" button 108 is held closed motor 59 will operate to add dropweights through the Geneva mechanism, as previously described, until all of the dropweights are rendered effective. When the last dropweight is applied shaft 51 (Fig. 3) will have been rotated to a position causing bottom limit switch 66 to open. This breaks the series circuit through coil 94 and "on" button 108 so that coil 94 is deenergized even though the "on" button remains closed. Hence once all of the dropweights are rendered effective motor 59 cannot operate further in its dropweight addition direction.

A holding circuit is provided for the "on" button 108 so that it is only necessary for the operator to momentarily press the "on" button, with the resulting addition of a single dropweight. This holding circuit includes relay contacts 94" and limit switch 65 in parallel with "on" button 108 and lower limit switch 66. Thus upon pushing button 108 to energize coil 94, contacts 94 will be closed to provide a connection between coil 94 and supply lead 93 independently of the "on" button. Limit switch 65 is adapted to be automatically open as soon as a unit weight has been applied. As seen in Figs. 3 and 4, Geneva driver 60 upon leaving engagement with Geneva wheel 56 momentarily engages the actuator of limit switch 65 to open that switch. Opening switch 65 momentarily opens the hold circuit around "on" button 108 to deenergize coil 94 completely. Thus, only one dropweight will be added, and it is necessary that "on" button 108 be again pushed to add another dropweight. With this arrangement it will be seen that the operator can hold the "on" button in its closed condition and add as many dropweights as are desired, or he can alternately push and release the "on" button to add the dropweights one at a time.

In a similar fashion the removal of dropweights is controlled by "off" button 110 which controls the energization of coil 96. When switch leg 116 engages contact 120 (is disposed in the semi-manual position) coil 96 may be energized by pressing button 110. The energizing circuit for coil 96 includes normally closed upper limit switch 67, switch leg 116, button 110 and relay contacts 94'. As best seen in Fig. 3, upper limit switch 67 is controlled by follower 69 and cam 72, the cam and follower being so arranged that the upper limit switch is opened whenever all of the unit weights are removed from suspension on rod 23. Thus if all of the weights are ineffective, pressing "off" button 110 cannot energize coil 96 to energize motor 59 in a dropweight removing direction.

Assuming one or more or all of the dropweights are effective, the dropweights can be removed by closing "off" button 110, which energizes coil 96 to actuate relay contacts 96' into a position connecting wire 104 with power supply lead 92. This causes motor 59 to operate in a direction to remove the dropweights. A holding circuit is provided for "off" button 110, which holding circuit includes relay contacts 96" controlled by coils 96 and limit switch 64. As soon as "off" button 110 is closed to energize coil 96, contacts 96" close to provide a parallel holding circuit around the "off" button, which retains coil 96 energized even after the "off" button is released. As Geneva arm 60 leaves engagement with Geneva wheel 56, after a dropweight has been removed, the Geneva arm momentarily opens limit switch 64 to break the holding circuit and deenergize coil 96. If, of course, button 110 is retained in its depressed state by the operator, coil 96 remains energized and the opening of the holding circuit will not stop the removal of unit weights. As top unit weight 22 is rendered ineffective upper limit switch 67 (Figs. 3 and 7) is opened, as described, to prevent any possible further motor operation in a dropweight removal direction.

In order to prevent improper operation of the electrical system, relay contacts 94' and 96' act as interlocks. In other words, as seen as coil 94 is energized to actuate relay contacts 94' to a position connecting lead 92 to wire 106, which operates the motor in a direction to add a dropweight, contacts 94' simultaneously render coil 96 incapable of energization even if "off" button 110 is operated. Correspondingly, the energization of coil 96 by pressing "off" button 110 causes relay contacts 96' to render coil 94 incapable of operation. The above described holding circuits and interlocks are equally effective when the circuit is in condition to completely automatically add and remove the dropweights.

When the addition and removal of the dropweights is to be entirely automatic, the control switch 112 is moved to the "automatic" position which thereby disposes switch legs 114 and 116 in the position shown in Fig. 7. With switch 112 in this position the push buttons 108 and 110 are rendered completely inoperative, while at the same time the automatic control circuit now to be described is conditioned for operation. Switch leg 114 connects lead 93 to the cathode 124 of vacuum tube 126. The plate 128 of this vacuum tube is supplied with D. C. voltage from the A. C. supply source by means of uni-directional conductor 130 and condenser 132. Connected in series in the plate circuit of tube 126 is relay coil 134, which has relay contacts 134' connected between coil 94 and lower limit switch 66. When coil 134 is energized by plate current flow through tube 126, contacts 134' will be closed to energize coil 94 (in the same manner as if "on" button 108 had been pressed during semi-automatic operation) to operate motor 59 in its dropweight adding direction. The energization of coil 134 is controlled by electrical coupling 86 which comprises electro-magnetically coupled coils 136 and 138. Coil 138 is connected in series with the parallel combination of resistor 140 and capacitor 142 between control grid 144 of tube 126 and power lead 93. Coil 136 is connected in series with a condensor 146 between plate 128 and lead 93. So long as the electro-magnetic coupling between coils 136 and 138 is not interrupted, a negative bias voltage is impressed on control grid 144 to retain tube 126 in a con-conducting condition. In other words, no plate current flows through the tube, and therefore current flow through relay coil 134 is insufficient to energize the relay; thus contacts 134' remain open. Upon positioning interceptor 75 between coils 136 and 138, the coupling between these coils is broken, which causes the removal of the negative bias voltage from control grid 144 so that plate current flows through the tube and coil 134 to energize the coil and close contacts 134'. Thus when sufficient load is placed on the scale to cause indicator 74 to rotate to scale capacity, interceptor 75 moves between coils 136 and 138 of electrical coupling 86. So long as the load on the scale does, in fact, exceed the scale capacity, interceptor 75 remains between coils 136 and 138 so as to cause coil 134 to be energized, which in turn via contacts 134' energizes coil 94, to add dropweights by motor operation. If the load of the scale is such that it can be indicated by the scale with the addition of but one dropweight, as soon as the one dropweight is added, indicator 74 moves away from its upper scale limit position and interceptor 75 is removed from between coils 136 and 138. This once again causes the negative bias voltage to appear on control grid 144 to cut off plate current flow. If the scale loading is such that more than one dropweight is required, indicator 74 will remain at the upper scale limit with interceptor 75 between coils 136 and 138 to retain tube 126 in its conductive condition, which in turn via coil 134, contacts 134', coil 94 and contacts 94' energizes motor 59 to add dropweights until such time as indicator 74 moves away from its upper scale limit.

A similar electronic tube arrangement is provided to control the automatic removal of dropweights. For this purpose an electronic tube 150, having cathode, control grid, and plate elements, has a relay coil 152 connected in its plate circuit while parallel resistor 154 and condenser 156 are connected in the grid circuit. Coils 80 and 82 provide an electro-magnetic coupling 83 between the plate and grid circuit of the tube in the same manner as previously described with regard to coils 136 and 138. The coupling between coils 80 and 82 causes tube 150 to be non-conductive so long as coil coupling is unimpeded. After a load has been balanced and weighed on the scale, assuming that dropweights have been added, the removal of the load causes indicator 74 to return to its zero or initial position at which time interceptor 75 moves between coils 80 and 82 of electro-magnetic coupler 83. Breaking this coupling removes the negative grid bias from the control grid of tube 150 so that plate current flows in the tube and energizes coil 152 to thereby close contacts 152' in the energizing circuit of coil 96. This of course causes motor operation in a direction to remove a dropweight. When all of the load is removed, indicator 74 moves to and remains in its zero position at all times until another load is applied and therefore all of the dropweights will be removed. If only part of the scale load is removed, indicator 74 will remain at its zero position until enough dropweights are removed to permit a new balance and then the indicator moves away from its "zero" position.

The lower limit switch 66 and upper limit switch 67 operate in a same manner, with completely automatic drop weight application and removal, as they do in semi-automatic operation. Thus if a load is placed on the scale, which is greater than the total capacity of the scale, the interceptor will move between coils 136 and 138 to cause all four dropweights to be added, and even after this the interceptor remains in a position which would otherwise cause further dropweight addition. However, lower limit switch 66 is caused to open as the last dropweight is added to thereby deenergize completely tube 126 by opening the plate circuit, so that coil 134 is deenergized to open contacts 134' and deenergize coils 94, whereupon motor operation ceases. Likewise when all of the dropweights are removed upper limit switch 67 is opened to deenergize the plate circuit of tube 150, which in turn prevents any further motor operation.

An important feature of this invention resides in the provision of a time delay circuit associated with the electronic tubes controlling the automatic application and removal of dropweights. As previously mentioned a parallel resistor capacitor combination is provided between the grids and cathodes of tubes 126 and 150, which parallel networks prevent an instantaneous change in the grid bias voltage when the interceptor moves between the coupled coils. By way of example when the coupling between coils 136 and 138 is unimpaired, a negative bias voltage is produced on control grid 144, which bias voltage also charges condenser 142. When the interceptor moves between the coils the bias voltage is no longer induced in coil 138. However the bias voltage does not instantaneously fall to a zero value since condenser 142 discharges through resistor 140 at a timed rate, dependent upon the particular resistance and capacitance values, to relatively slowly reduce the negative bias voltage. Thus tube 126 is not instantaneously caused to conduct plate current but will conduct after a time delay. Hence if the indicator comes to a balance position close to scale capacity so that interceptor 75 is adjacent to but not stationary between the coils of coupling 86, any vibrations or oscillations of the indicator which would cause interceptor 75 to move momentarily between the coils will not cause another dropweight to be added. Likewise when the scale load causes pointer 74 to assume a balance position close to its initial or zero position, scale vibrations may momentarily cause the interceptor to go between the coils of coupler 83 but this will not produce dropweight removal. In other words interceptor 75 must remain between the coils of either coupling 83 or 86 a sufficient length of time before automatic dropweight addition or removal is effected.

In order to transmit the change in capacity effected by the unit weights 22 to the auxiliary rotatable dial 14, a toothed segment 160 is suitably mounted, as by bracket 161 to the scale frame. The teeth of said segment engage a gear 162 carried by shaft 51, and movement of shaft 51 when weights are added or removed, causes a proportionate movement of said segment, and through segment leg 164, actuation of a connecting rod 165. The connecting rod 165 is pivotally attached to the free end of an actuating arm 166 secured to the inner end of a shaft 168 pivotally mounted in a boss 169 within the dial frame 11. A gear sector 171 fixed to shaft 168, reflects the movement of gear segment 160, and through toothed segment 172 carried by spider 173 on which rotatable dial 14 is mounted, related movement of said dial. In a well known manner, suitable graduations provided on said rotatable dial face, are positioned adjacent windows or apertures in the main dial, whereby the change in scale capacity is indicated visibly and numerically for the convenience of the operator.

It is apparent from the foregoing description, and with reference to the accompanying drawings, that a weighing scale so constructed is fully automatic. When placed in operating condition, unit-weights will be added or removed from the scale beam, as required, to increase or decrease the scale capacity, as the case may be, in order to accommodate an applied load which the scale capacity initially could not indicate. Furthermore, such changes in scale capacity will not occur until, and unless, the applied load is, in fact, without the then scale capacity, whereupon transfer of unit weights to or from the scale beam will be positively controlled so that only such weights as are necessary to balance the load will be actuated. In addition, the described invention is not susceptible to incomplete operation, but will, when once in operation, conclude said operation to the exclusion of any change in the scale condition.

While the foregoing specification sets forth the invention in specific terms, it is to be understood that many variations and modifications may be resorted to without departing from the broad aspects of the invention as defined by the following claims.

Having now described the invention, what is claimed is:

1. In a scale including a frame and a weigh beam fulcrumed thereon, an associated apparatus for increasing the weighing capacity of the scale, including a vertically movable carrier, unit weights carried by said carrier, drive means adapted to raise and lower said carrier, whereby to transfer said unit weights to and from the weigh beam, a reversible motor mounted on said frame, a Geneva mechanism connecting said motor and said drive means for operating said drive means intermittently during motor operation.

2. In a weighing scale having a scale beam and an indicator operated thereby, a unit weight mechanism for application of or removal of unit weights to or from the scale beam one at a time, a reversible motor, drive means connecting the motor to the unit weight mechanism for operation thereby, including a Geneva device for interrupting the drive means upon the application or removal of each weight, said drive means further including switch means for interrupting the operation of said motor after the application or removal of each weight, means operated by the indicator for selectively controlling the direction of drive of said motor whereby weights may be selectively applied or removed as needed, said last means continuing operation of the unit weight mechanism after each interrupting of the drive means by the Geneva device, and each interrupting of the motor operation by said motor interrupting means, if further application or removal of weights is needed.

3. In a scale including a frame, a weight beam fulcrumed thereon, and a weight indicator operated by said beam, an associated apparatus for increasing the weighing capacity of the scale, including a vertically movable carrier, unit weights carried by said carrier, drive means adapted to raise and lower said carrier, whereby to transfer unit weights to and from the weigh beam, a reversible motor mounted on said frame, means connecting the motor to the drive means, including a Geneva mechanism for interrupting said drive means upon transfer of a unit weight to or from the weigh beam, said drive means further including switch means for interrupting the operation of said motor after the application or removal of each weight, means operated by the indicator for selectively controlling the direction of drive of said motor whereby weights may be selectively applied or removed, said last means operable only when the scale load exceeds or is less than the scale capacity, and said last means continuing operation of the motor after each interrupting of the drive means by the Geneva mechanism and each interrupting of the motor operation by said motor interrupting means, only when the scale load continues to exceed or be less than the scale capacity.

4. In a weighing scale having a unit weight mechanism operable for changing the scale capacity, an electric control circuit for said mechanism comprising an electronic tube having control grid and plate circuits, a relay in said plate circuit, electromagnetic coupling coils associated with said grid circuit and adapted to produce one grid bias voltage when the coupling of said coils is uninterrupted and another bias voltage when the coupling is interrupted, said one grid bias voltage preventing relay operation and said other bias voltage causing said relay means to operate said mechanism, and means positioned by said weighing scale to interrupt the coupling of said coils upon unbalance of said scale to an extent requiring a change in scale capacity.

5. In a weighing scale having a unit weight mechanism operable for changing the scale capacity, an electric control circuit for said mechanism comprising an electronic tube having control grid and plate circuits, a relay in said plate circuit, electromagnetic coupling coils associated with said grid circuit and adapted to produce one grid bias voltage when the coupling of said coils is uninterrupted and another bias voltage when the coupling is interrupted, said one grid bias voltage preventing relay operation and said other bias voltage causing said relay means to operate said mechanism, means positioned by said weighing scale to interrupt the coupling of said coils upon unbalance of said scale to an extent requiring a change in scale capacity, and parallel resistor and capacitor circuit elements connected in said grid circuit and adapted to gradually change said grid bias voltage from said one grid bias voltage to said another grid bias voltage when the coupling of said coils is interrupted.

6. In a weighing scale having a mechanism operable for adding and removing unit weights to change scale capacity, a control circuit for said mechanism comprising a first electronic tube, a first relay in the plate circuit of said first tube to operate said mechanism and add a unit weight, a first electromagnetic coupler connected in the grid circuit of said first tube adapted to produce a grid voltage to cut-off plate current flow through said first tube, a second electronic tube, a second relay in the plate circuit of said second tube to operate said mechanism and remove a unit weight, a second coupler connected in the grid circuit of said second tube adapted to produce a grid voltage to cut-off plate current flow through said second tube, and interceptor means positioned by said scale and movable to a position adjacent said first coupler to alter the grid voltage on said first tube to operate said first relay and movable to a position adjacent said second coupler to alter the grid voltage on said second tube to operate said second relay.

7. In a weighing scale having a mechanism operable for adding and removing unit weights to change scale capacity, a control circuit for said mechanism comprising a first electronic tube, a first relay in the plate circuit of said first tube to operate said mechanism and add a unit weight, a first electromagnetic coupler connected in the grid circuit of said first tube adapted to produce a grid voltage to cut-off plate current flow, a second electronic tube, a second relay in the plate circuit of said second tube to operate said mechanism and remove a unit weight, a second coupler connected in the grid circuit of said second tube adapted to produce a grid voltage to cut-off plate current flow, an indicator for said scale, and an interceptor movable with said indicator, each of said couplers comprising a pair of electromagnetically linked coils, said interceptor being movable between the coils of said first and second coupler to interrupt the magnetic fields thereof and change the grid voltages produced by said couplers whereby said first and second tubes, respectively, are rendered conductive to actuate said first and second relays.

8. In a scale including a frame, a weigh beam fulcrumed thereon, and a weight indicator operated by said beam, an associated apparatus for increasing the weighing capacity of the scale, including a vertically movable carrier, unit weights carried by said carrier, drive means adapted to raise and lower said carrier, whereby to transfer unit weights to and from the weigh beam, a reversible motor mounted on said frame, means connecting the motor to the drive means, including Geneva mechanism for interrupting said drive means upon transfer of a unit weight to or from the weigh beam, switch means operated by said Geneva mechanism for interrupting the operation of said motor after the application or removal of each weight, an electrical control circuit for selectively controlling the direction of drive of said motor whereby weights may be selectively applied or removed, said control circuit including electromagnetically coupled coils for operating said motor means upon breaking the coupling of said coils, and an interceptor movable in accordance with the weight indicator positioning to move between and break said coupled coils when said indicator reaches a predetermined position.

9. In a scale including a frame, a weigh beam fulcrumed thereon, and a weight indicator operated by said beam, an associated apparatus for increasing the weighing capacity of the scale, including a vertically movable carrier, unit weights carried by said carrier, drive means adapted to raise and lower said carrier, whereby to transfer unit weights to and from the weigh beam, a reversible motor mounted on said frame, means connecting the motor to the drive means, including a Geneva mechanism for interrupting said drive means upon transfer of a unit weight to or from the weigh beam, an electrical control circuit for selectively controlling the direction of drive of said motor whereby weights may be selectively applied or removed, said control circuit including electromagnetically coupled coils for operating said motor means upon breaking the coupling of said coils, an interceptor fixed to and movable in accordance with the weight indicator to move between and break said coupled coils when said indicator reaches a predetermined position, current flow delay means arranged in said circuit to delay motor operation until and unless the coupling between said coils remains broken for a given period of time, and switch means operated by said Geneva mechanism, operative upon the removal of or application of a unit weight for interrupting the operation of said motor.

10. In a weighing scale having a capacity weight changing mechanism which applies or removes one or more unit weights one after the other to or from the weighing scale, motor means for intermittently operating said capacity weight changing mechanism in its unit weight application or removal function, an electrical control circuit for said motor means comprising a first electronic tube, a first relay in the plate circuit of said first tube to operate said mechanism and add a unit weight, a first electromagnetic coupler connected in the grid circuit of said first tube adapted to produce a grid voltage to cut-off plate current flow, a second electronic tube, a second relay in the plate circuit of said second tube to operate said mechanism and remove a unit weight, a second coupler connected in the grid circuit of said second tube adapted to produce a grid voltage to cut-off plate current flow, each of said couplers comprising a pair of electromagnetically linked coils, an indicator for said scale, an interceptor movable with said indicator, said interceptor being movable to a position between the coils of said first or second coupler to interrupt the magnetic fields thereof and change the grid voltages produced by said couplers whereby said first and second tubes, respectively, are rendered conductive to actuate said first and second relays, interlock contact means operated by the energized one of said first and second relays for selectively controlling the direction of drive of said motor whereby weights may be selectively applied or removed, and switch means operative upon the removal of or application of a unit weight for interrupting said motor means.

11. In a scale including a frame, a weigh beam fulcrumed thereon, and a weight indicator operated by said beam, an associated apparatus for increasing the weighing capacity of the scale, including a vertically movable carrier, unit weights carried by said carrier, drive means adapted to raise and lower said carrier, whereby to transfer unit weights to and from the weigh beam, a reversible motor mounted on said frame, means connecting the motor to the drive means, including a Geneva mechanism for interrupting said drive means upon transfer of a unit weight to or from the weigh beam, an electrical control circuit connected to said motor comprising a first electronic tube, a first relay in the plate circuit of said first tube to operate said motor in a direction to add a unit weight, a first switch means connected to said Geneva mechanism and operable thereby to interrupt motor operation upon application of a unit weight, a first electromagnetic coupler connected in the grid circuit of said first tube adapted to produce a grid voltage to cut-off plate current flow through said first tube, a second electronic tube, a second relay in the plate circuit of said second tube to operate said motor in a direction to remove a unit weight, a second switch means connected to said Geneva mechanism and operable thereby to interrupt motor operation upon removal of a unit weight, a second coupler connected in the grid circuit of said second tube to produce a grid voltage to cut-off plate current flow through said second tube, each of said couplers comprising a pair of electromagnetically linked coils, an interceptor mounted on said indicator and movable to a position between the coils of said first or second coupler to interrupt the magnetic field thereof and change the grid voltages produced by said couplers whereby said first and second tubes, respectively, are rendered conductive to actuate said first and second relays, interlock contact means connected between said first and second relays and said motor and operable by the energized one of the said relays to selectively control the direction of drive of said motor whereby weights may be selectively applied or removed, and limit switch means connected to said carrier operative upon the removal of or application of all unit weights for interrupting motor operation.

12. In a weighing scale having a weigh beam and an indicator operated thereby, a capacity weight changing mechanism which applies or removes one or more unit weights one after the other to or from the weigh beam, a reversible motor, intermittent drive means actuated by the motor for operating said weight changing mechanism, an electrical control circuit for selectively controlling the direction of drive of said motor whereby unit weights may be selectively applied or removed, said control circuit including a first electromagnetic coupler for causing operation of the motor in a direction to add a unit weight whenever said coupler is broken, a second coupler for causing operation of the motor in a direction to remove a unit weight whenever said coupler is broken, each of said couplers comprising a pair of electromagnetically linked coils, an interceptor movable in accordance with the weight indicator positionment to move between and break the electromagnetic link of said first or second coupler when the indicator reaches a predetermined position, and means connected to said intermittent drive means operative upon the application or removal of a unit weight for interrupting motor operation.

13. In a weighing scale having a weigh beam and an indicator operated thereby, a capacity weight changing mechanism which applies or removes one or more unit weights one after the other to or from the weigh beam, a reversible motor, intermittent drive means actuated by the motor for operating said weight changing mechanism, an electrical control circuit for selectively controlling the direction of drive of said motor whereby unit weights may be selectively applied or removed, including a first electromagnetic coupler arranged at the "capacity" position of the scale for causing operation of the motor in a direction to add a unit weight whenever said coupler is broken, a second coupler arranged at the "zero" position of the scale for causing operation of the motor in a direction to remove a unit weight whenever said coupler is broken, each of said couplers comprising a pair of electromagnetically linked coils, an interceptor movable in accordance with the weight indicator positionment to move between and break the electromagnetic link of said first or second coupler when the indicator reaches "capacity" or "zero" position of the scale, switch means connected to said intermittent drive means operative upon the application or removal of a unit weight for interrupting motor operation, and limit switch means operated by said weight changing mechanism operative upon the application or removal of all unit weights for interrupting motor operation.

14. In a weighing scale having a weigh beam and an indicator operated thereby, a capacity weight changing mechanism which applies or removes one or more unit weights one after the other to or from the weigh beam, a reversible motor, intermittent drive means actuated by the motor for operating said weight changing mechanism, an electrical control circuit for selectively controlling the direction of drive of said motor whereby unit weights may be selectively applied or removed comprising a first electronic tube, a first relay in the plate circuit of said first tube to operate said motor in a direction to add a unit weight whenever said first tube conducts, a first electromagnetic coupler arranged at the "capacity" position of the scale for causing said first tube to conduct when said coupler is broken, a first holding circuit for said first tube, means closing said first holding circuit when said first tube conducts to operate said relay, first switch means connected to said intermittent drive means and operable thereby to break said holding circuit upon application of a unit weight, a second electronic tube, a second relay in the plate circuit of said second tube to operate said motor in a direction to remove a unit weight whenever said second tube conducts, a second coupler arranged at the "zero" position of the scale for causing said second tube to conduct when said coupler is broken, a second holding circuit for said second tube, means closing said second holding circuit when said second tube conducts to operate said relay, second switch means connected to said intermittent drive means and operable thereby to break said holding circuit upon removal of a unit weight, an interceptor movable in accordance with the weight indicator positionment to move between and break the first or second electromagnetic coupler when the indicator reaches "capacity" or "zero" position of the scale, first and second current flow delay means arranged in said circuit to delay the respective tube conduction until and unless the associated coupler remains broken for a given period of time, and limit switch means actuated by said weight changing mechanism operative upon application or removal of all unit weights for preventing tube conduction.

References Cited in the file of this patent

UNITED STATES PATENTS

| | | |
|---|---|---|
| 1,564,555 | Goldsmith | Dec. 8, 1925 |
| 1,661,555 | Bryce | Mar. 6, 1928 |
| 1,847,893 | Palmer | Mar. 1, 1932 |
| 1,940,769 | Potter | Dec. 26, 1933 |
| 2,014,275 | Bousfield | Sept. 10, 1935 |
| 2,346,121 | Weckerly | Apr. 4, 1944 |
| 2,426,508 | Isserstedt | Aug. 26, 1947 |
| 2,462,913 | Sorensen | Mar. 1, 1949 |
| 2,473,494 | Wannamaker | June 14, 1949 |
| 2,580,242 | Reek | Dec. 25, 1951 |
| 2,597,831 | Willis | May 20, 1952 |
| 2,647,230 | Reek | July 28, 1953 |
| 2,669,680 | Wrenn | Feb. 16, 1954 |
| 2,728,885 | Cooper et al. | Dec. 27, 1955 |
| 2,812,170 | Kennedy | Nov. 5, 1957 |
| 2,812,172 | Whitcroft et al. | Nov. 5, 1957 |

FOREIGN PATENTS

| | | |
|---|---|---|
| 505,049 | Great Britain | May 4, 1939 |